(No Model.)
L. A. JOHNSON.
FISH NET.
No. 446,755. Patented Feb. 17, 1891.
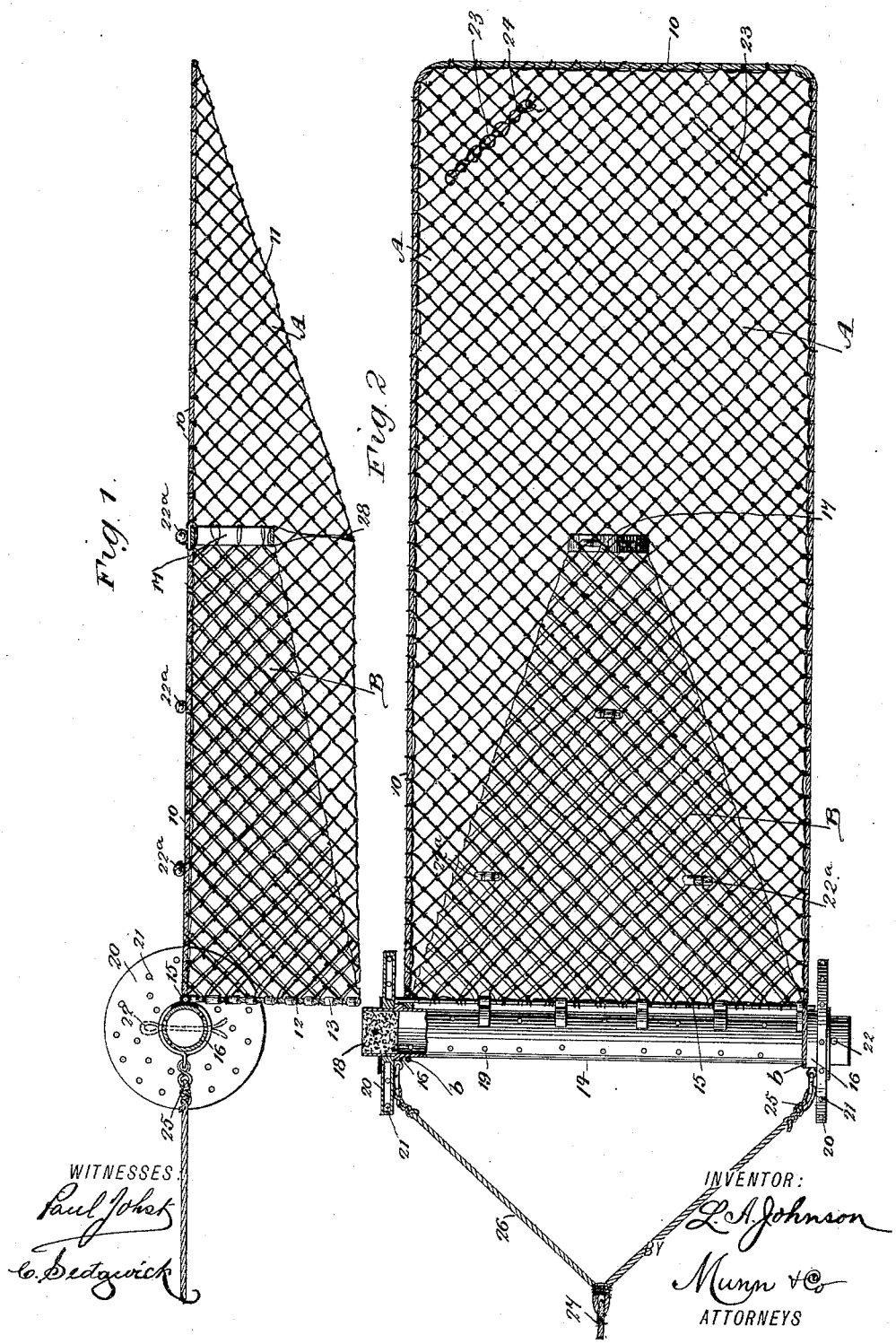
WITNESSES:
Paul Johst
C. Sedgwick
INVENTOR:
L. A. Johnson
BY
Munn & Co.
ATTORNEYS

UNITED STATES PATENT OFFICE.

LARENCE A. JOHNSON, OF SAN FRANCISCO, CALIFORNIA.

FISH-NET.

SPECIFICATION forming part of Letters Patent No. 446,755, dated February 17, 1891.

Application filed August 1, 1890. Serial No. 360,700. (No model.)

*To all whom it may concern:*

Be it known that I, LARENCE A. JOHNSON, of San Francisco, in the county of San Francisco and State of California, have invented a new and useful Improvement in Fish-Nets, of which the following is a full, clear, and exact description.

My invention relates to an improvement in fish-nets, and has for its object to provide a net constructed with an interior trap forming a portion thereof, and to provide a spar for the attachment of the net, which spar is fitted with wheels or whirls at or near the ends, whereby the net may be drawn over the bottom of a body of water silently and with ease, and also wherein the net may be more conveniently hoisted aboard a boat or other vessel than heretofore.

Another object of the invention is to so construct the net that the fish may be readily abstracted therefrom without interfering in the least with the position of the trap.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a central vertical section taken through the net and the spar to which it is attached, the net being shown in operative position; and Fig. 2 is a plan view of the net, the spar being partially in section.

The outer or main net A may be constructed in any suitable or approved manner, and is of coarser material, preferably, than that employed in the construction of the inner net or trap B. The outer net is provided with a stout cord or rope 10, extending from the mouth thereof along each side and the closed end, as is best shown in Fig. 2. The net is so constructed that when it is in the water the top will be practically flat, while the lower portion will sag down, imparting thereto a bag-like appearance, the lower fuller portion of the net being preferably made to taper from a point at or near its center to the cord or rope 10 at its closed end, as is best illustrated at 11 in Fig. 1. The lower or swell edge of the net A has secured thereto in any approved manner a stout rope or cord 12, upon which rope or cord a number of weights 13 is secured.

In connection with the net A a boom or spar 14 is employed, which boom or spar is hollow and made of any desired length or may be built in any number of sections. The boom or spar is provided with an attached jack-stay 15, and to the said jack-stay the upper or straight margin of the mouth of the net is secured, the extremities of the leaded or weighted rope or cord 12 being preferably carried around the spar or boom and secured thereto in any approved manner, as shown at *b* in Fig. 2, the attachment being effected at the inner side of the collars 16, secured to the spar or boom near the ends thereof.

The inner net B is conical, and at the contracted end of the net, which is the inner end, the net is secured to a ring or band 17 of metal or other stiff material. The enlarged or mouth end of the inner net is secured to the jack-stay and to the weighted rope 12 of the outer net. The boom or spar 14 is preferably closed at its ends by plugs 18, of cork or other material, and in the peripheral surface of the boom or spar a number of apertures 19 are produced. Upon the extremities of the boom or spar, immediately outside of the collars 16 thereon, a hollow wheel 20 or disk-like whirl is held to revolve. The whirls are provided with apertures 21 in their side faces and likewise in their peripheral surfaces, and are held in position upon the spar or boom by means of washers located in front of them and pins 22, passing down through the boom or spar in front of the washers.

Upon the upper surface of the main net A, over the inner net B, a series of floats 22$^a$ is located, and the upper surface of the inner net is attached in any suitable or approved manner to the corresponding surface of the outer net. Similar floats are secured to the ring 17 of the inner conical net above the surface of the outer net.

In the outer net at the corners of its closed end diagonal openings 23 are made, and the opposed walls of the openings are united by means of lacing 24, as shown in Fig. 2. Eyes 25 are secured to the boom or spar between the whirls, one near each end, and hooks attached to the extremities of a rope or chain 26 are passed through the said eyes, the said rope or chain having attached near its central portion one end of a line 27, the opposite end being secured to any suitable form of dragging or hoisting tackle.

The under surface of the ring 17 of the inner conical net, which constitutes a trap, is connected with the bottom of the main net A, preferably, by means of a double guy 28, as shown in Fig. 1.

In operation, when the net is cast overboard and reaches the bottom of the sheet of water to be dragged, the net assumes the position shown in Fig. 1, the upper flat surface of the net being floated and the lower surface weighted down by the rope 12 at its mouth, and the whirls engaging with the bottom assist the net over any inequalities of the surface or obstructions thereon, and also serve to hold the upper face of the net some distance from the bottom, thus permitting the mouth to assume as large proportions as possible. The fish, as the net is drawn forward, enter the mouth of the main net, pass into the trap, and out through the ring 17 into the rear portion of the said main net. When the net is brought alongside and is to be drawn aboard a vessel, suitable tackle is employed and the whirls serve to render the work of elevating the net comparatively easy and also serve to hold the boom or spar out of engagement with the vessel's side. The apertures in the whirls and in the boom or spar are for the purpose of admitting water thereto, and thereby increasing the weight of the structure.

The fish are not removed through the mouth of the net, but from the rear portion thereof, and such removal is effected in an expeditious manner by unlacing the walls of the openings 24 in the shallow rear portion of the net, whereupon the fish may be readily withdrawn and dumped into any convenient receptacle.

I desire it to be distinctly understood that although specific construction has been shown and described I do not confine myself thereto, as equivalent construction may be employed without materially altering the character of the invention.

Having thus described my invention, I claim as new and desire to secure by Letters Patent—

1. In a fish-net, the combination, with an outer net having a substantially flat upper surface and a full lower surface and a weighted mouth, the full lower surface being tapered from a point near the center upward in the direction of the flat upper surface, of an inner essentially conical trap-net, the enlarged end of which trap-net is secured to the mouth of the main net, while the inner or contracted end is provided with an opening and is attached to the upper face of the main net, substantially as shown and described.

2. In a fish-net, the combination, with a spar or boom and wheels mounted to revolve thereon, of a net of bag-like form having the upper edge of its mouth attached to the spar or boom and the portion below the boom or spar weighted, substantially as described.

3. In a fish-net, the combination, with a hollow boom or spar provided with hollow whirls near its ends, of a net the upper portion of the mouth of which is attached to the spar and the lower portion weighted, and an essentially conical inner trap-net attached to the mouth of the main net and having its inner contracted end provided with an opening and supported from the top of the main net, as and for the purpose set forth.

4. In a fish-net, the combination, with a tubular boom or spar, a jack-stay attached to the same, and hollow whirls mounted to revolve upon the spar, of a net the upper surface of which is practically flat and the lower portion full, the upper edge of the mouth of the said net being attached to the jack-stay and its lower edge weighted, and an inner conical trap-net secured at its mouth to the mouth of the main net and provided with an opening in its inner or contracted end, and means for attaching the inner to the outer net and floating the upper portion of both nets, substantially as and for the purpose specified.

5. In a fish-net, the combination, with a tubular apertured boom or spar, a jack-stay secured to the said boom, and hollow apertured whirls mounted to revolve upon the boom, of a net the upper surface of which is practically flat and the lower portion full, the upper edge of the mouth of the said net being attached to the jack-stay and its lower edge weighted, and an inner conical trap-net secured at its mouth to the mouth of the main net and provided with an opening at its inner or contracted end, and means for attaching the inner to the outer net and floating the upper portion of both nets, substantially as and for the purpose specified.

6. As an improved article of manufacture, a net provided with an essentially flat upper surface and a full lower surface tapered away from the mouth, the said flat upper surface being provided with slot-like openings the walls of which are laced together, substantially as and for the purpose specified.

LARENCE A. JOHNSON.

Witnesses:
P. THORSTEN,
JOHN JÜRSS.